United States Patent
Smith

(10) Patent No.: US 9,477,743 B2
(45) Date of Patent: Oct. 25, 2016

(54) SYSTEM AND METHOD FOR LOAD BALANCING IN A DISTRIBUTED SYSTEM BY DYNAMIC MIGRATION

(71) Applicant: Oracle International Corporation, Redwood Shores, CA (US)

(72) Inventor: Randall Smith, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 85 days.

(21) Appl. No.: 14/322,703

(22) Filed: Jul. 2, 2014

(65) Prior Publication Data

US 2016/0004571 A1    Jan. 7, 2016

(51) Int. Cl.
*G06F 17/30* (2006.01)
*G06F 9/50* (2006.01)

(52) U.S. Cl.
CPC ....... *G06F 17/30598* (2013.01); *G06F 9/5088* (2013.01)

(58) Field of Classification Search
CPC .............. G06F 7/78; G06F 8/00–8/78; G06F 9/44–9/455; G06F 11/36
See application file for complete search history.

(56) References Cited

U.S. PATENT DOCUMENTS

| | | | |
|---|---|---|---|
| 7,685,109 B1 * | 3/2010 | Ransil | G06F 17/30336 707/999.003 |
| 9,098,214 B1 * | 8/2015 | Vincent | G06F 8/10 |
| 2007/0130566 A1 * | 6/2007 | van Rietschote | G06F 9/45533 718/1 |
| 2011/0131569 A1 * | 6/2011 | Heim | G06F 9/45558 718/1 |
| 2011/0276695 A1 * | 11/2011 | Maldaner | H04L 41/00 709/226 |
| 2012/0311603 A1 * | 12/2012 | Kudo | G06F 3/0611 718/105 |
| 2013/0111484 A1 * | 5/2013 | Chen | G06F 11/0757 718/102 |
| 2013/0151683 A1 * | 6/2013 | Jain | G06F 3/0611 709/223 |
| 2013/0279334 A1 * | 10/2013 | Xu | H04L 47/125 370/235 |
| 2014/0229949 A1 * | 8/2014 | Cai | G06F 9/45533 718/1 |
| 2015/0039763 A1 * | 2/2015 | Chaudhary | H04L 47/125 709/226 |
| 2015/0301869 A1 * | 10/2015 | Chan | G06F 9/5088 718/105 |

OTHER PUBLICATIONS

Qin et al., "Dynamic Load Balancing for I/O-Intensive Applications on Clusters", 2009.*
Langer, "An Optimal Distributed Load Balancing Algorithm for Homogeneous Work Units", 2014.*

* cited by examiner

*Primary Examiner* — Wei Zhen
*Assistant Examiner* — Zhan Chen
(74) *Attorney, Agent, or Firm* — Tucker Ellis LLP

(57) ABSTRACT

A system and method for load balancing between components of a distributed data grid. The system and method support dynamic data migration of selected data partitions in response to detection of hot spots in the data grid which degrade system performance. In embodiments, the system and method relies upon analysis of per-partition performance statistics for both the identification of data nodes which would benefit from data migration and the selection of data nodes for migration. Tuning of the data migration thresholds and method provides for optimizing throughput of the data grid to avoid degradation of performance resulting from load-induced hot spots.

20 Claims, 4 Drawing Sheets

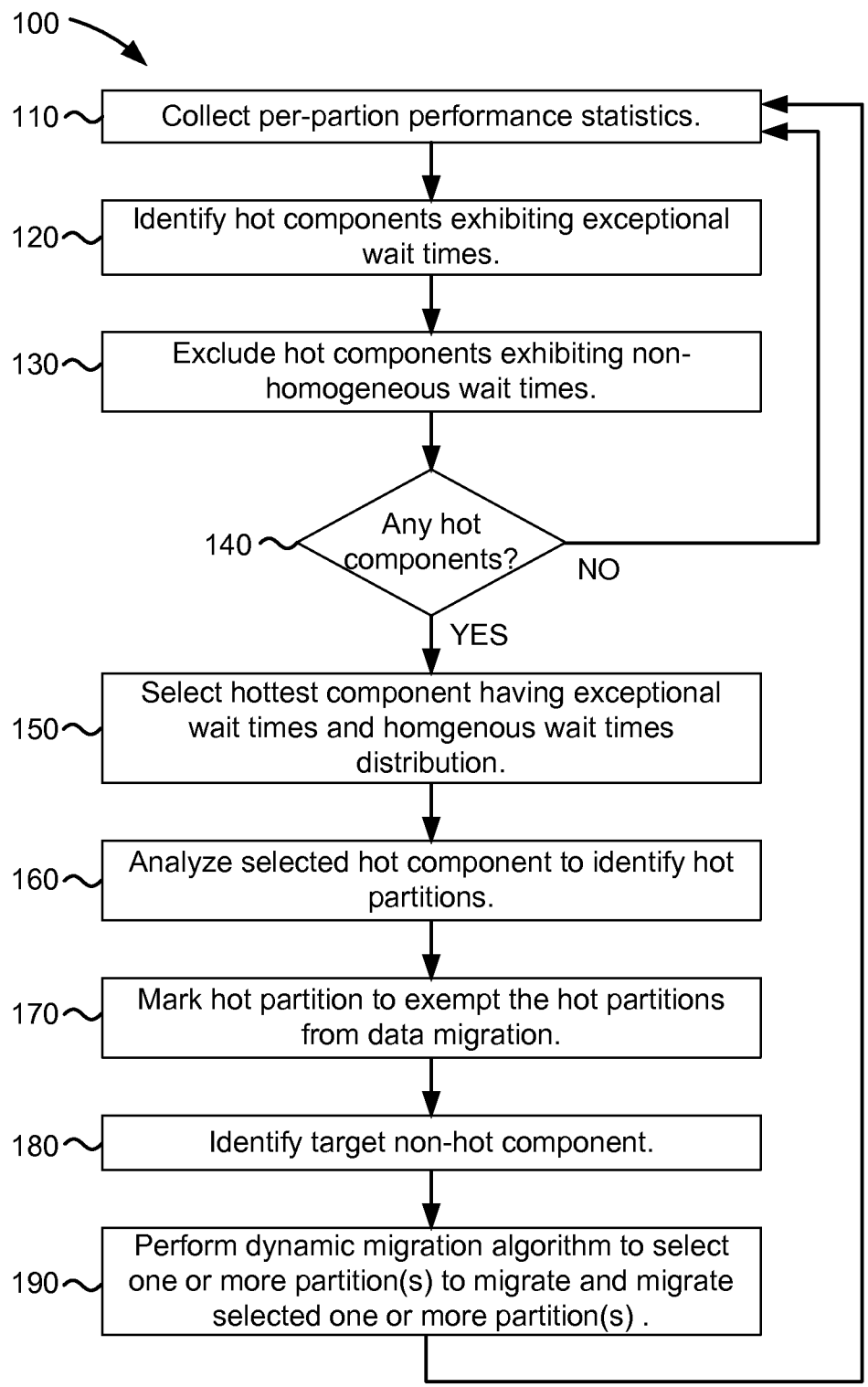

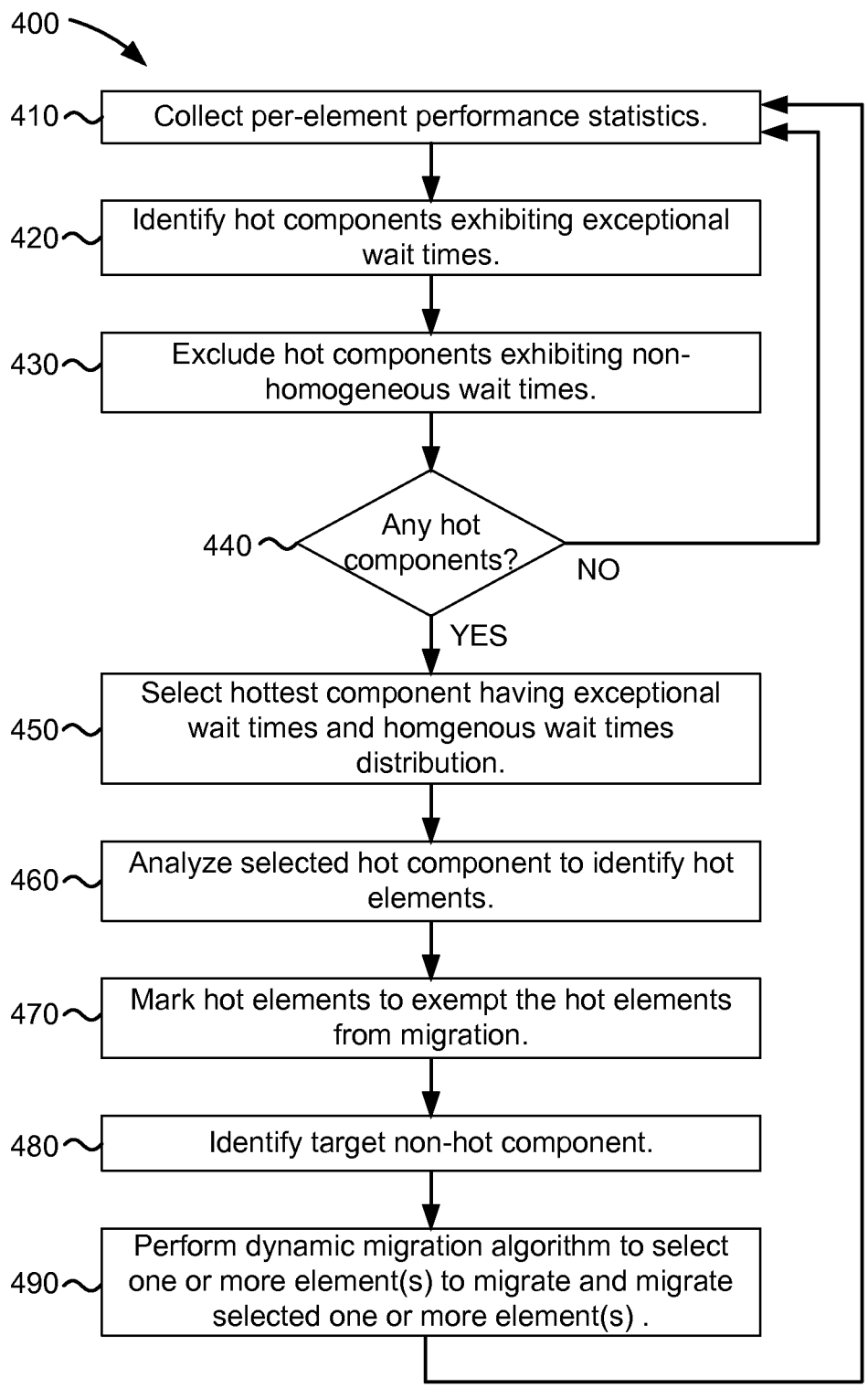

SYSTEM AND METHOD FOR LOAD BALANCING IN A DISTRIBUTED SYSTEM BY DYNAMIC MIGRATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to supporting load balancing in a distributed system.

SUMMARY

Described herein are systems and methods for load balancing between components of a distributed system. The system and method can support dynamic migration of selected elements in response to detection of hot spots in the system which degrade system performance. In particular, the system and method can be applied to support dynamic data migration of selected data partitions in a distributed data grid in response to detection of hot spots which degrade system performance.

The above and further features, advantages and benefits of the present invention will be apparent upon consideration of the present description taken in conjunction with the accompanying drawings.

BRIEF DESCRIPTION OF THE DRAWINGS

FIG. 1 shows an overview of a method for load balancing between components of a distributed data grid according to an embodiment of the present invention.

FIG. 4 shows a method for load balancing between components of a distributed system according to an alternative embodiment of the present invention.

DETAILED DESCRIPTION

Figure 2A:
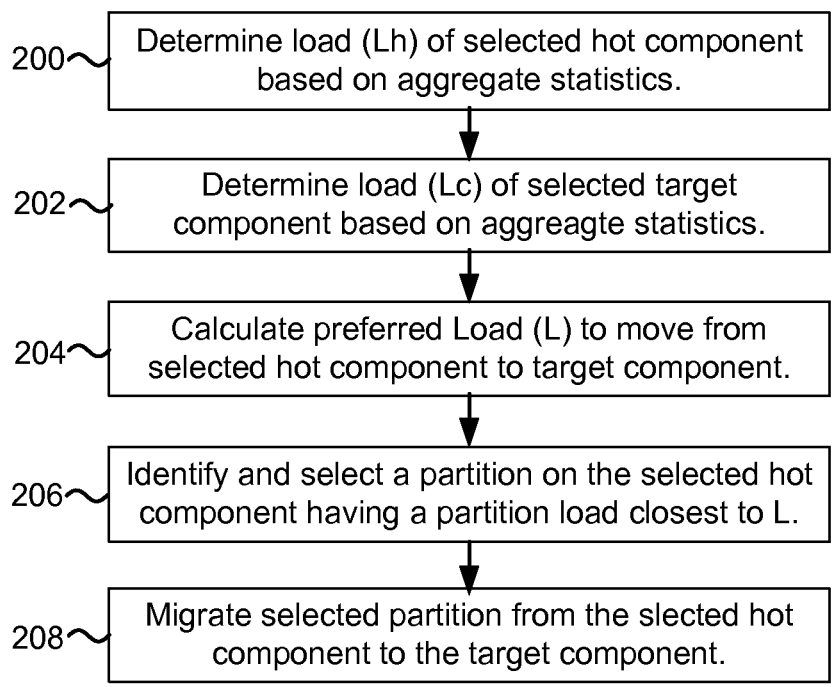
FIGS. 2A and 2B show alternative data migration methods for load balancing between components of a distributed data grid in the method of FIG. 1 according to embodiments of the present invention.

Described herein are systems and methods for load balancing between components of a distributed system. The system and method can support dynamic migration of selected elements in response to detection of hot spots in the system which degrade system performance. In a particular, embodiment the system and method can be applied to support dynamic data migration of selected element in a distributed system in response to detection of hot spots which degrade system performance.

According to embodiments of the present invention, systems and methods for load balancing between components of a distributed data grid are provided. The system and method support dynamic data migration of selected data partitions in response to detection of hot spots in the data grid which degrade system performance. In embodiments, the system and method relies upon analysis of per-partition performance statistics for both the identification of data nodes which would benefit from data migration and the selection of data nodes for migration. Tuning of the data migration thresholds and selection of the data migration method provides for optimizing throughput of the data grid to avoid degradation of performance resulting from load-induced hot spots.

According to a particular embodiment of the present invention, a method is provided for load balancing in a cluster storage system comprising a plurality of nodes. Per-partition performance statistics for each partition of a plurality of nodes wherein said per-partition performance statistics include wait times and execution times. A source node is identified within the cluster storage system from which to move a plurality of data objects, wherein the source node comprises a node with exceptional wait times compared to other nodes, and homogeneous wait times among its partitions. The partitions on the source node are analyzed to identify hot partitions wherein a hot partition is a partition with a disproportionately large share of the execution time load compared to other partitions of the source node. Then, load on the source node is alleviated by migrating one or more partitions from the source node to a target node, wherein the one or more partitions are selected from not hot partitions.

According to another particular embodiment of the present invention, a cluster storage system is provided having a plurality of nodes. The cluster storage system is provided with a load balancing system. Per-partition performance statistics for each partition of a plurality of nodes wherein said per-partition performance statistics include wait times and execution times. A source node is identified within the cluster storage system from which to move a plurality of data objects, wherein the source node comprises a node with exceptional wait times compared to other nodes, and homogeneous wait times among its partitions. The partitions on the source node are analyzed to identify hot partitions wherein a hot partition is a partition with a disproportionately large share of the execution time load compared to other partitions of the source node. Then, load on the source node is alleviated by the load balancing system by migrating one or more partitions from the source node to a target node, wherein the one or more partitions are selected from not hot partitions.

Distributed Data Grid

In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster has low response time, high throughput, predictable scalability, continuous availability and information reliability. As a result of these capabilities, a data grid clusters is well suited for use in computational intensive, stateful middle-tier applications.

A distributed data grid can provide data storage and management capabilities by distributing data over a number of servers working together. The data grid can be middleware that runs in the same tier as an application server or within an application server. It can provide management and processing of data and can also push the processing to where the data is located in the grid. In addition, an in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

The functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

Some examples of data grid clusters, e.g., the Oracle Coherence data grid cluster, store information in-memory to achieve higher performance, and employ redundancy in keeping copies of that information synchronized across multiple servers, thus ensuring resiliency of the system and the availability of the data in the event of server failure. For example, the Oracle Coherence data grid cluster provides replicated and distributed (partitioned) data management and caching services on top of a reliable, highly scalable peer-to-peer clustering protocol.

Load Balancing in a Distributed Data Grid by Dynamic Data Migration

The system and method of the present invention has particular applicability to a non-replicated distributed data grid. The members of the data grid can be referred to as "components." The basic unit of data migration can be called a "partition." A partition may hold one datum, it may hold many. In a non-replicated data grid there is only one active copy of each unique datum (there may also be one or multiple replica/backup copies which are used for failover). The distributed data grid receives "tasks," and each task is associated with a particular datum, and must therefore be handled by the particular component on which the particular datum resides. There is a queue of incoming tasks for each component. Handling of a task by its associated component exerts load on that component alone.

In general each component of the distributed data grid is capable of processing many tasks in parallel. However a feature of non-replicated data grids is that a particular task is required to be performed on a particular component associated with a particular datum used by the task. Often tasks for a certain datum need to lock the datum, to protect it from concurrent modification (checked out). In that case, the execution of a task on the datum blocks all other tasks for the same datum. Additional tasks for the particular datum become serialized and wait in the queue until the current task for the datum is completed and the datum is unlocked (checked in).

A non-replicated distributed data grid can develop a "hot spot" that consumes much of the resources on the "hot component." A "hot spot" may be for example a datum "hot datum" which is accessed at a much higher rate than other pieces of data. When a datum becomes the subject of a large number of tasks it can be called "hot." A hot partition (in which the hot datum resides) can impact the component hosting the datum by increasing the time-in-queue for all tasks on that component, not just the hot tasks. In the non-replicated data grid each particular piece of data is only available from one component of the cluster (with a backup copy of the data on another component which is only used in failover). Thus, the component which hosts the primary copy of the hot datum can be called a "hot component" because it must satisfy all the tasks related to the hot datum.

One result of the development of hot spots is increasing the latency of access to the hot datum because of the high load and consequent serialization of tasks associated with the hot datum. However, when the total data grid is under high load, perhaps non-intuitively, serialization of tasks on the hot component can also negatively impact the throughput of other non-hot components as well. That is, other components not hosting the hot datum may display increased latency and reduced throughput for normally loaded data. Accordingly hot spots may degrade performance throughout the data grid. The system and method of the present invention is designed to mitigate performance degradation issues resulting from these phenomena.

Embodiments of the present invention address the problem of degraded performance associated with a hot datum by providing a system and method for dynamically moving data away from the hot component onto non-hot components. Counter-intuitively, increasing the amount of data on the non-hot components by moving the data from hot components can reduce the latency of tasks on the non-hot components and increase the total throughput of the data grid.

This technique can be used to enhance throughput for certain classes of distributed data grids which allow for migration of data. The system and method can be applied, for example, in any data grid (such as Oracle's Coherence) which supports data migration. An example of such a distributed data grid includes an in-memory database in which the components are operating system processes scattered among various physical machines. Another example of such a system is a distributed file system, in which a component is a node responsible for a particular subset of files.

Moving data away from the hot component improves throughput of the entire data grid up to a point. Going too far in this data migration process will begin to overburden other components, and may leave the hot component with unused capacity. Thus a feature of embodiments of the invention is determining which data to move away from a hot component and how much data to move away from a hot component in order to best enhance throughput.

In order to identify a hot partition, it is desirable to collect statistics on the task times on a per-partition basis. Specifically, the system collects statistics related to task in-queue waiting time (the time between when the task arrives at a component, and when it starts to be serviced) and the task execution time (i.e.: how long after the servicing begins until the task is completed) on a per-partition basis. The sample time is also known (the length of time during which statistics are collected). The use of both execution time and wait time statistics are advantageous to implementation of embodiments of the invention.

Using the collected statistics the system checks for and identifies hot components (if any). To make a determination that a component is hot, the system determines whether a component satisfies two conditions: exceptional wait times compared to other components, and homogeneous wait times among the partitions of the component. Exceptional wait times indicate a system is highly loaded. Homogeneous wait times in a highly loaded system indicate that data migration as provided herein may be effective to reduce load on the data grid. There may be no component satisfying both conditions, in which case there is no hot component (as defined herein), and the system does not proceed with dynamic data migration for load balancing.

To determine whether a component exhibits exceptional wait times compared to other components the per-partition wait times are aggregated into per-component statistics. Wait times are considered a more reliable indicator of component load than execution times. The wait time for one component may stand out as excessive, but what is the threshold for "excessive" wait time? This threshold may be a multiplier on the mean component wait time, a more sophisticated assessment based on the mean and standard deviation of the distribution of system-wide wait times, or it may be that the wait time exceeds some service level agreement. Percentage of recent time spent above this threshold ("dwell" time) may be considered as well, so that a brief spike in demand is not sufficient to mark a component as exceptional. The threshold and dwell time can be used as tunable parameters. In some cases a "high bar" is set such that meeting the exceptional wait times condition represents a truly significant and persisting problematic condition.

To determine whether a component exhibits homogeneous wait times, the distribution of wait times among a component's partitions is analyzed. If the analysis finds a distribution clustered around the mean value, the distribution may be considered to be "homogeneous". However, the distribution may have a high mean wait time value that is due to mainly low values with a single high value outlier. This can arise from the locking of a single hot datum—in that case the component may have a vast amount of spare resource. Such a lightly loaded machine may still stand out as backed-up with exceptional wait time. However, the component is not marked as hot because data migration will not help reduce the wait time or improve data grid throughput. Outlier partitions are detected by measuring the ratio of the partition wait time to the mean wait time among all partitions on the component. If the ratio is above a tunable threshold, the distribution is determined to be inhomogeneous. A component is marked as hot only if it has exceptional wait time and a homogeneous wait time distribution.

As an example of a situation in which the locking of a single hot datum cause a high mean wait time in a component that has spare resource, consider a component that is a machine with a large number of cores and a large number of worker threads. It may be that only one worker thread is able to be utilized because only a single item of data D is being accessed by a large number of tasks all destined for D. These tasks have become serialized due to locking of D, so all but one active task wait in the queue.

After identifying all hot components (if any) exhibiting both exceptional wait times and a homogenous wait time distribution, the system selects the hottest component. If there are no components exhibiting exceptional wait times and a homogenous wait time distribution collection no further action are taken beyond collecting statistics and monitoring for the appearance of hot components. The selection of a hottest component from among the hot components can be made based upon aggregated wait time statistics for the components. The component with the largest wait time is selected as the hottest component.

Once a hottest component is selected as described above, the system analyzes the selected hot component to identify hot partition(s). The purpose in finding hot partitions is to exempt them from migration. The system scans the partitions on the selected hot component to find a partition or partitions with a disproportionately large share of the execution time load—such partitions are marked as "hot." As with components, this decision to mark a partition can be based on a statistical assessment, or on a simple threshold. It's possible there may be no hot partitions at all, if the load is sufficiently evenly distributed across all the component's partitions.

Any hot partitions are made exempt from subsequent data migration for load balancing. Hot partitions are exempted from data migration for a number of reasons. First, no tasks can be run on a migrating partition, so migrating a hot partition can further lengthen an already long task queue. Furthermore, all tasks in the queue for a migrating partition have to be forwarded to the new destination, thus the migration of lightly loaded partitions requires migration of fewer tasks and is therefore less demanding.

Once any hot partition(s) are marked, a migration algorithm can be used to alleviate load on the hot component by migrating some non-hot partitions from the hot component to a different component. In one embodiment an incremental migration method is used for migrating one non-hot partition at a time from a hot component to a different component. In another embodiment a batch migration method is used for migrating a selected group of non-hot partitions from a hot component to a different component. The migration algorithms are described in more detail below.

FIG. 1 is a block diagram which illustrates a method according to an embodiment of the present invention. As shown in FIG. 1, in step 110, per-partition performance statistics are collected from the components of the data grid. In step 120, aggregated per-partition performance statistics are analyzed to identify one or more hot component(s) exhibiting exceptional wait times compared to other components. In step 130, the per-partition statistics for the identified hot components are analyzed to identify components also exhibiting non-homogenous wait times. Hot components exhibiting non-homogenous wait times are excluded. At step 140, if there are no hot components exhibiting homogeneous wait times, the method returns to collecting performance statistics at step 110 (no load balancing is performed). At step 140, if there is one or more hot component(s) exhibiting homogeneous wait times, the method continues to step 150.

Referring again to FIG. 1, at step 150, the hottest component is selected from among the identified hot components having homogenous wait times. The hottest component is then analyzed in preparation for dynamic data migration. At step 160, the per-partition statistics for the selected hot component are analyzed to identify hot partitions. At step 170, the hot partitions (if any) are marked as exempt from data migration. At step 180, a target component is selected. At step 190, a dynamic migration algorithm (see incremental and batch migration algorithms described below) is performed to select one or more partition(s) to move from the selected hot component to the selected target component and then migrate the one or more selected partition(s) to the target component. Collection of per-partition performance statistics is then continued at step 110 and the process continues to monitor for and identify hot partitions and perform further dynamic data migration as described.

Dynamic Partition Migration Algorithms

As described above, a migration algorithm can be used to alleviate load on the hot component by migrating some non-hot partitions from the hot component to a different component (Step 190 of FIG. 1). In one embodiment an incremental migration method is used for migrating one non-hot partition at a time from a hot component to a different component. In another embodiment a batch migration method is used for migrating a selected group of non-hot partitions from a hot component to a different component. The migration algorithms (Step 190 of FIG. 1) are described in more detail below.

Incremental Migration Method

In the incremental migration method, partitions are migrated one at a time from a hot component to a target component. The target component is the least-loaded component at that time that is able to receive a partition. A target may not be eligible to receive a partition if, for example, there is some unique feature of the current hot component that requires that partition to remain there, there is insufficient memory at the target, or if there is some policy that would prevent such a move (e.g.: the target holds a backup copy of the partition from the hot component, and a policy deems it unsafe to move a primary so that primary and backup reside on the same component.)

Once a target component is selected, and a set of (non-hot) partitions is identified as candidates for migration to that target, then a single partition must be selected to move. The partition is selected based on the load of the hottest component "Lh" and the load on the least hot (coldest) component "Lc." The selection of the partition to move from the selected hot component to the target component is based on Lh and Lc.

The system analyzes the ability of the target component to provide execution time of the incoming partitions, thus, the load is analyzed based on execution time. Note the sum of all execution times on a component divided by the statistics collecting sample time gives the degree of parallel thread activity on the component assuming a component is configured with no more worker threads than there are true cores available. Thus if the sampling interval is 0.5 seconds, and the sum of all the partition execution times on a component adds up to 2.5, it means that on average 5 threads were busy. This is used as a measure of load on the component.

The preferred amount of Load (L) to be moved from the selected hot component to the target component can be calculated as (Lh−Lc)/2. Moving load of this amount results reduces the standard deviation of the spread of loads across all components. Thus the system scans all migration candidate partitions (e.g. excluding exempted hot partitions described above) on the selected hot component and selects the partition whose load is closest to this value of L. The selected partition having a load closest to the value L is then migrated from the selected hot component to the target component. Incremental migration steps can be repeated by selecting and migrating additional partitions from the selected hot component to the same or different target components.

FIG. 2A illustrates an incremental migration method according to an embodiment of the invention. At step 200, the load Lh on the selected hot component is determined by analyzing execution time on the selected hot component. At step 202, the load Lc on the selected target component is determined by analyzing execution time on the selected hot component. At step 204, the desired load L to be transferred is calculated as half the difference between the loads on the selected hot component and selected target component using the formula (Lh−Lc)/2. At step 206, the partitions on the selected hot component are scanned to find the non-exempted partition having an execution load closes to L (non-exempted meaning not marked as hot or otherwise exempted from migration to the target). At step 208, the partition identified in step 206 is migrated from the selected hot component to the selected target component.

Batch Migration Method

In the batch migration method a set of partitions is migrated from the selected hot component to the target component. As in the incremental method, the preferred amount of Load (L) to be moved from the selected hot component to the target component can be calculated as (Lh−Lc)/2. Moving load of this amount results reduces the standard deviation of the spread of loads across all components. However, in the batch migration method, the system scans all migration candidate partitions (e.g. excluding exempted hot partitions described above) on the selected hot component and selects a subset containing a plurality of partitions having an aggregate load of L (or close to it). There are many different methods for finding such a subset, and we do not elaborate on that algorithm further here. Once the subset of candidate partitions is selected, the subset of partitions is then migrated from the selected hot component to the target component.

The incremental method is more conservative (less likely to "over commit") but the bulk migration method more quickly achieves an optimal distribution of loads between components and may therefore be preferable if there are a large number of partitions.

Figure 2B:
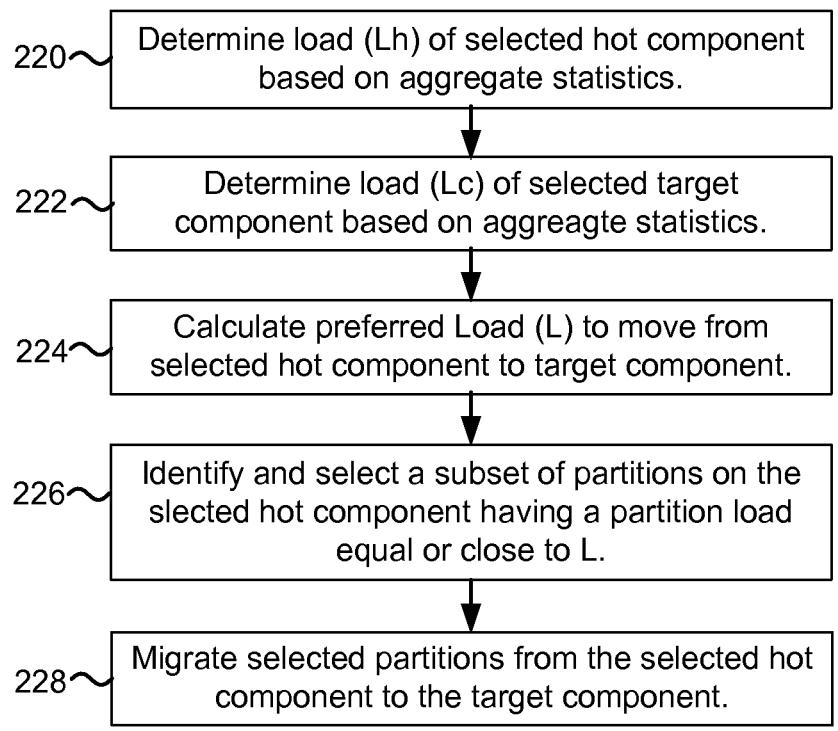

FIG. 2B illustrates a batch migration method according to an embodiment of the invention. At step 220, the load Lh on the selected hot component is determined by analyzing execution time on the selected hot component. At step 222, the load Lc on the selected target component is determined by analyzing execution time on the selected hot component. At step 224, the desired load L to be transferred is calculated as half the difference between the loads on the selected hot component and selected target component using the formula (Lh−Lc)/2. At step 226, the partitions on the selected hot component are scanned to find a subset of the non-exempted partitions having an execution load closes to L (non-exempted meaning not marked as hot or otherwise exempted from migration to the target). At step 210, the partitions identified in step 206 are migrated from the selected hot component to the selected target component as a batch.

Figure 3:
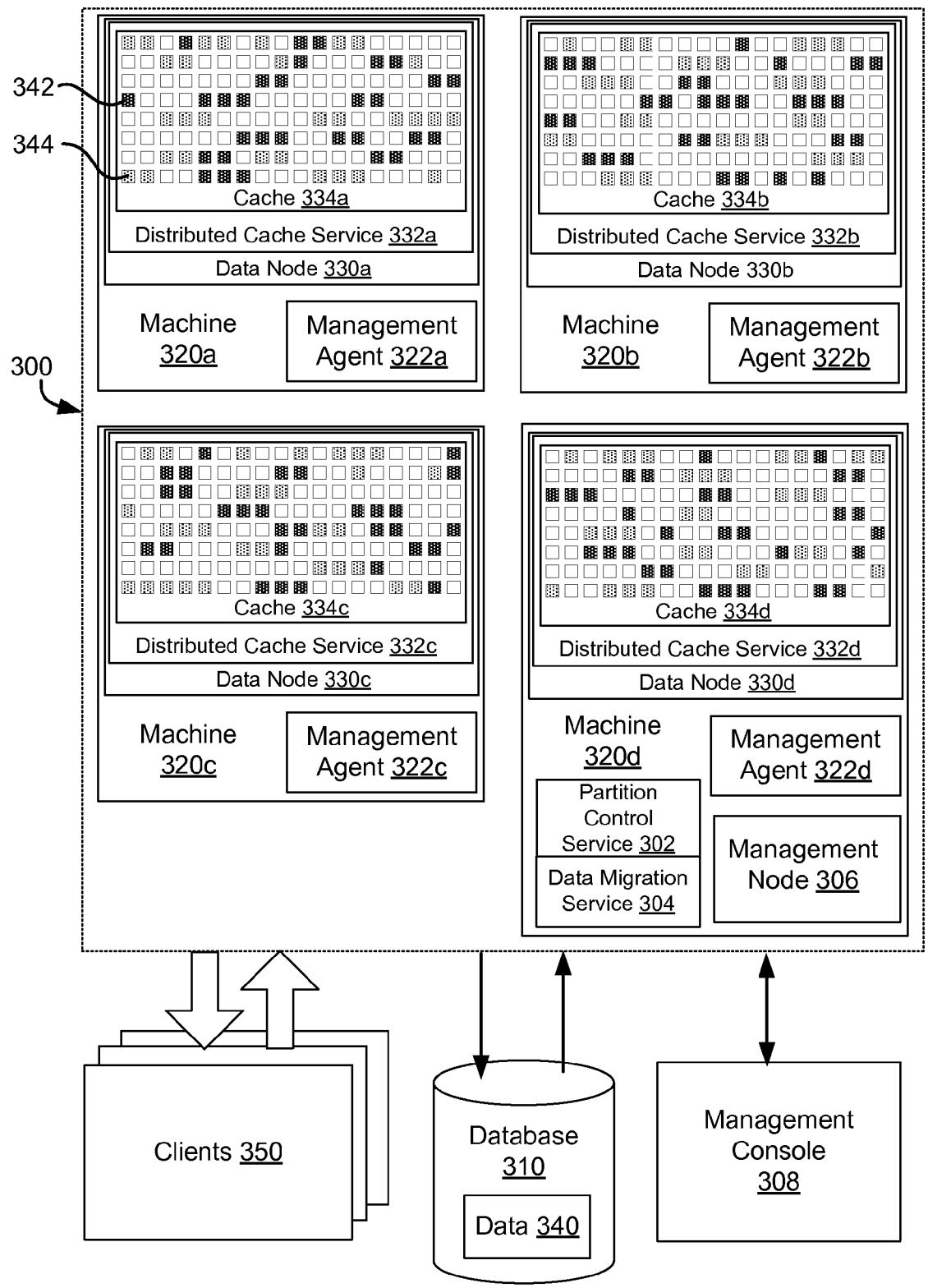
FIG. 3 illustrates a distributed data grid system for implementing dynamic data migration for load balancing according to an embodiment of the present invention.

Example Distributed Data Grid Utilizing Load Balancing by Dynamic Data Migration FIG. 3 illustrates an example of a distributed data grid system for implementing dynamic data migration for load balancing according to an embodiment of the present invention. As shown in FIG. 3, a data grid cluster, or data grid 300, is a system comprising a plurality of computer servers which work together to manage information and related operations, such as computations, within a distributed or clustered environment. Data grid 300 is illustrated as comprising four machines 320*a*, 320*b*, 320*c*, 320*d*, with four data nodes 330*a*, 330*b*, 330*c*, 330*d*, and a management node 306 running on the machines. A data grid 300 may comprise any number of machines or nodes depending on the needs of the system.

An example of data grid 300 is the Oracle Coherence data grid cluster which can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

The functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. For example, the data nodes of data grid 300 provide distributed cache services 332*a*, 332*b*, 332*c*, 332*d*.

Data grid 300 provides data storage and management capabilities by distributing data 340 from e.g. database 310 over a number of servers working together. Although data 340 is shown as sourced from a database 310, data 340 may be sourced or created from other sources, e.g. session data, such that there is no requirement of an underlying database 310. Data grid 300 distributes data 340 across the memory of data nodes 330*a*, 330*b*, 330*c*, 330*d* such that clients 350 and/or applications in data grid 300 can access data 340 directly from memory. Where a database 310 is the original source of data 340, the database can be used for data writes, it does not contribute to data retrieval as the clients 350 retrieve data from the data grid 300. If changes are made to the data the changes are synchronized between primary and backup partitions and subsequently written back to database 310 (if present) using asynchronous writes to avoid bottlenecks. Reading from and writing to the data grid 300 is much faster than could be achieved using the database 310 directly. The data grid 300 is also fault tolerant and highly available in that loss of a machine does not significantly impact the operation of the data grid. Loss of node results in a seamless failover to backup partitions held elsewhere in the data grid and all operations that were running on the failed node are re-executed elsewhere. The data grid efficiently detects node loss and deals with it. The data grid 300 also deals with the addition of new nodes in the same seamless manor by automatically assigning partitions to new nodes added to the cluster.

Data grid 300 provides failover and failback without any data loss, and that includes the distributed cache service. The distributed cache service allows the number of backups to be configured; as long as the number of backups is one or higher, any cluster node can fail without the loss of data. The in-memory data grid can eliminate single points of failure by automatically and transparently failing over and redistributing its clustered data management services when a server becomes inoperative or is disconnected from the network. Additionally, when a new server is added, or when a failed server is restarted, it can automatically join the cluster and services can be failed back over to it, transparently redistributing the cluster load.

The data 340 is distributed over all the servers of data grid 300 in such a way that no two servers are responsible for the same piece of cached data (datum). In data grid 300 data 340 is distributed among as primary partitions 342 and backup partitions 344 over caches 334*a*, 334*b*, 334*c*, and 334*d*. The distributed cache service allows one or more backups to be configured; as long as the number of backups is one or higher, any cluster node can fail without the loss of data. The primary partition 342 and backup partition (or multiple backup partitions) holding a particular datum are hosted in different caches such that, if the server hosting the primary partition fails, the backup partition is activated and no data is lost. Note that multiple backup partitions may be configured if desired. Failover involves promoting a backup partition to be the primary partition and creating a new backup partition. When a data node fails, all remaining data nodes determine what partitions each holds in backup that the failed cluster node had primary responsible for when it died.

In this way, the data grid provides data persistence and fault tolerance. The data persistence and fault tolerance of the data grid 300 allows it to be used as the record source of the data 340. A database (such as database 310) may optionally be used for additional backing up the data 340 but is not required.

A partition control service 302 distributes the data 340 among the servers of data grid 300 upon startup and also redistributes the data 340 when servers are added and removed from the system. For example, assuming all the servers have the same capabilities the partition control service may initially distribute the same number of primary and backup partitions to each of the caches. Partition control service 302 can be centralized or distributed across the node of the data grid 300. A policy for partition distribution can be created to distribute a fair-share of partitions to each storage-enabled server (based on number of partitions) while maintaining (as much as the service membership topology allows) machine, rack, or site safety. Data 340 may, in some cases, be initially distributed by populating the data grid 300 with data 340 from a database 310. Data 340, for example session data, may alternatively or additionally be created by application/services and distributed over the data grid 300 with or without initial population of data from a database 310. In some cases, for example, data in the data grid arises from dynamic activities of some collection of external systems—in which case there may be no conventional database used.

The data node components of data grid 300 are capable of processing many tasks in parallel. However, as described above, a non-replicated distributed system can develop a "hot spot" that consumes much of the resources on a particular data node the "hot component" despite a fair-share distribution of partitions (based on number of partitions). A "hot spot" may be for example a datum "hot datum" which is accessed at a much higher rate than other pieces of data. In the non-replicated system each particular piece of data is only available from one data node of the data grid 300 (with a backup copy of the data on another data node which is only used in failover). Thus, the data node which hosts the primary copy of the hot datum can be called a "hot component" because it must satisfy all the tasks related to the hot datum. As would be expected, latency of access to the hot datum is increased on the data node because of the high load and consequent serialization of tasks associated with the hot datum. However, when the total system is under high load, perhaps non-intuitively, serialization of tasks on the data node hosting the hot partition can also negatively impact the throughput of other non-hot data nodes as well. That is, other data nodes not hosting the hot datum may display increased latency and reduced throughput for normally loaded data. Accordingly hot spots may degrade performance throughout the data grid 300.

Embodiments of the present invention address this problem by providing a data migration service 304 which implements the method described above for dynamically moving partitions away from the data node holding the hot partition. This data migration service 304 can be used to dynamically enhance throughput for certain classes of distributed systems. The data migration service 304 can be provided, for example, in any system (such as Oracle's Coherence) which supports dynamic data migration. Counter-intuitively increasing the amount of data on the non-hot components by moving selected partitions from the node hosting identified hot partitions can reduce the latency of tasks on the non-hot components and increase the throughput of the system.

In order to identify a hot partition, it is desirable to collect statistics on the task times on a per-partition basis. As shown in FIG. 3, management agents 322a, 322b, 322c, 322d are provided on each of the machines in data grid 300. The management agents are responsible for collecting per-partition performance statistics and transmitting them to a management node 306 in the data grid 300. Management agents 322a, 322b, 322c, 322d and management node 306 cooperate to collect, among other things, statistics related to task in-queue waiting time (the time between when the task arrives at a component, and when it starts to be serviced) and the task execution time (i.e.: how long after the servicing begins until the task is completed) on a per-partition basis. Data migration service 304 uses the collected statistics in order to provide for moving partitions among data nodes 330a, 330b, 330c, and 330d utilizing the method described above.

For example, per-partition performance statistics are collected by management node 306 from the management agents of the components of data grid 300. Aggregated per-partition performance statistics are analyzed by data migration service 304 to identify data nodes exhibiting exceptional wait times compared to other data nodes. Per-partition statistics for the hot data nodes are analyzed by data migration service 304 to identify data nodes exhibiting non-homogenous wait times. Data nodes exhibiting non-homogenous wait times are excluded. If there are no data nodes exhibiting exceptional wait times and homogeneous wait times, no load balancing is performed by data migration service 304. If there is one or more data node exhibiting exceptional wait times and homogeneous wait times, the hottest data node is selected from among the identified hot data nodes having homogenous wait times. The selected data node is then analyzed in preparation for dynamic data migration. The per-partition statistics for the selected data node are analyzed to identify hot partitions. The hot partitions (if any) are marked as exempt from data migration. A target data node having a low load is selected. Then the dynamic migration algorithm (see incremental and batch migration algorithms of FIGS. 2A and 2B) is performed by data migration service 304 to select one or more partition(s) to move from the selected hot data node to the target data node and then migrate the one or more selected partition(s) to the target data node. The migration function may be integrated into data migration service 304 or rely on an existing cluster service for moving partitions. Collection of per-partition performance statistics continues and the process continues to monitor for and identify hot partitions and perform further dynamic data migration as described.

Management console 308 communicates with management node 306 and permits an administrative user to view and analyze performance statistics collected by the management agents in data grid 300 at various levels, for example at the cluster level, node level and partition level. The management console may also provide an administrative user the ability to manage the cluster and nodes therein including e.g. adding, removing and restarting nodes in the cluster. Management console 308 may also communicate with data migration service 304 to enable/disable and/or set policies controlling implementation of the dynamic data migration method. Such policies may, for example, set thresholds for identifying hot components and hot partitions, and select incremental or batch methods for dynamic data migration. Management console 308 may also be used to monitor execution of the dynamic data migration methods and resulting data grid performance in order to optimize selected thresholds and data migration methods.

Load Balancing in a Distributed System by Dynamic Migration

The system and method of the present invention has general applicability to distributed systems comprising any collection of independently operating services. The members of the distributed system can be referred to as "components." The distributed system comprises elements operating on the components. Each component can host multiple elements operating simultaneously. The elements perform services and thus exert a load on the components hosting the element. The elements may be established at different levels of granularity depending upon the needs of the system. Examples of elements include, for example: services, applications, system virtual machines, process virtual machines, and/or virtual computers. To make use of the present invention, the distributed system includes a system for collecting performance statistics at the per-element level and migrating elements independently between components in response to the detection of hot spots as described below.

The distributed system receives "tasks," associated with particular elements, and the tasks must therefore be handled by the particular component on which the particular element resides. Each component of the distributed system may be capable of processing many tasks in parallel. There is a queue of incoming tasks for each component. Handling of a task by the component hosting the element exerts load on that component alone. Where a particular element is highly loaded, additional tasks for the element become serialized and wait in the queue. Thus, the distributed system can develop a "hot spot" that consumes much of the resources on the "hot component."

A "hot spot" may be for example a "hot service" which is called at a much higher rate than other services. When, for example, a service becomes the subject of a large number of tasks it can be called "hot." A hot element which provides the hot service can impact the component hosting the element by increasing the time-in-queue for all tasks on that component, not just the tasks for the hot service. In the non-replicated system each element provides unique functionality and thus is only available from one component of the distributed system (although a backup copy may exist on another component which is only used in failover). Thus, the component which hosts the hot element providing the hot service can be called a "hot component" because it must satisfy all the tasks related to the hot service. As described above, hot spots may degrade performance throughout the system. The system and method of the present invention can be applied to mitigate these performance issues.

Embodiments of the present invention address the problem of degraded performance associated with a hot element by providing a system and method for dynamically moving elements away from the hot component onto non-hot components. Counter-intuitively, redistributing elements onto non-hot components by moving the elements from hot components can reduce the latency of tasks on the non-hot components and increase the total throughput of the system. A feature of embodiments of the invention is determining which elements to move away from a hot component in order to best enhance throughput and avoid overburdening the non-hot components.

In order to identify a hot element, it is desirable to collect statistics on the task times on a per-element basis. Specifically, the system collects statistics related to task in-queue waiting time (the time between when the task arrives at a component, and when it starts to be serviced) and the task execution time (i.e.: how long after the servicing begins until the task is completed) on a per-element basis. The sample time is also known (the length of time during which statistics are collected). The use of both execution time and wait time statistics are advantageous to implementation of embodiments of the invention.

Using the collected statistics the system checks for and identifies hot components (if any). To make a determination that a component is hot, the system determines whether a component satisfies two conditions: exceptional wait times compared to other components, and homogeneous wait times among the elements of the component. Exceptional wait times indicate a system is highly loaded. Homogeneous wait times in a highly loaded system indicate that dynamic migration as provided herein may be effective to reduce load on the system. There may be no component satisfying both conditions, in which case there is no hot component (as defined herein), and the system does not proceed with dynamic migration of elements for load balancing.

To determine whether a component exhibits exceptional wait times compared to other components the per-element wait times are aggregated into per-component statistics. Wait times are considered a more reliable indicator of component load than execution times. The wait time for one component may stand out as excessive, but what is the threshold for "excessive" wait time? This threshold may be a multiplier on the mean component wait time, a more sophisticated assessment based on the mean and standard deviation of the distribution of system-wide wait times, or it may be that the wait time exceeds some service level agreement. Percentage of recent time spent above this threshold ("dwell" time) may be considered as well, so that a brief spike in demand is not sufficient to mark a component as exceptional. The threshold and dwell time can be used as tunable parameters. In some cases a "high bar" is set such that meeting the exceptional wait times condition represents a truly significant and persisting problematic condition.

To determine whether a component exhibits homogeneous wait times, the distribution of wait times among a component's elements is analyzed. If the analysis finds a distribution clustered around the mean value, the distribution may be considered to be "homogeneous". However, the distribution may have a high mean wait time value that is due to mainly low values with a single high value outlier. Outlier elements are detected by measuring the ratio of the element wait time to the mean wait time among all elements on the component. If the ratio is above a tunable threshold, the distribution is determined to be inhomogeneous. A component is marked as hot only if it has exceptional wait time and a homogenous wait time distribution.

After identifying all hot components (if any) exhibiting both exceptional wait times and a homogenous wait time distribution, the system selects the hottest component. If there are no components exhibiting exceptional wait times and a homogenous wait time distribution collection no further action are taken beyond collecting statistics and monitoring for the appearance of hot components. The selection of a hottest component from among the hot components can be made based upon aggregated wait time statistics for the components. The component with the largest wait time is selected as the hottest component.

Once a hottest component is selected as described above, the system analyzes the selected hot component to identify hot element(s). The purpose in finding hot elements is to exempt them from migration. The system scans the elements on the selected hot component to find an element or elements with a disproportionately large share of the execution time load—such elements are marked as "hot." As with components, this decision to mark an element can be based on a statistical assessment, or on a simple threshold. It's possible there may be no hot elements at all, if the load is sufficiently evenly distributed across all the component's elements.

Any hot elements are made exempt from subsequent migration for load balancing. Hot elements are exempted from dynamic migration for a number of reasons. First, no tasks can be run on a migrating element, so migrating a hot element can further lengthen an already long task queue. Furthermore, all tasks in the queue for a migrating element have to be forwarded to the new destination, thus the migration of lightly loaded elements is preferable because it requires migration of fewer tasks and is therefore less demanding.

Once any hot element(s) are marked, a migration algorithm can be used to alleviate load on the hot component by migrating some non-hot elements from the hot component to a different component. The incremental or batch migration methods described above may be used for migrating one or more non-hot elements from the hot component to non-hot components as described above with respect to FIGS. 2A and 2B depending on their suitability to the distributed system.

FIG. 4 is a block diagram which illustrates a method according to an embodiment of the present invention. As shown in FIG. 4, in step 410, per-element performance statistics are collected from the components of the system. In step 420, aggregated per-element performance statistics are analyzed to identify one or more hot component(s) exhibiting exceptional wait times compared to other components. In step 430, the per-element statistics for the identified hot components are analyzed to identify components also exhibiting non-homogenous wait times. Hot components exhibiting non-homogenous wait times are excluded. At step 440, if there are no hot components exhibiting homogeneous wait times, the method returns to collecting performance statistics at step 410 (no load balancing is performed). At step 440, if there is one or more hot component(s) exhibiting homogeneous wait times, the method continues to step 450.

Referring again to FIG. 4, at step 450, the hottest component is selected from among the identified hot components having homogenous wait times. The hottest component is then analyzed in preparation for dynamic migration. At step 460, the per-element statistics for the selected hot component are analyzed to identify hot elements. At step 470, the hot elements (if any) are marked as exempt from migration. At step 480, a target component is selected. At step 490, a dynamic migration algorithm (see incremental and batch migration algorithms described below) is performed to select one or more element(s) to move from the selected hot component to the selected target component and then migrate the one or more selected element(s) to the target component. Collection of per-element performance statistics is then continued at step 410 and the process continues to monitor for and identify hot elements/hot components and perform further dynamic migration as described.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In some embodiments, the storage medium of computable readable medium is a non-transitory medium.

The foregoing description of the present invention has been provided for the purposes of illustration and description. It is not intended to be exhaustive or to limit the invention to the precise forms disclosed. Many modifications and variations will be apparent to the practitioner skilled in the art. The technique for dynamic data migration presented herein can be suitably applied to any distributed, non-replicated system that supports migration of data among service components. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for load balancing in a distributed data grid comprising a plurality of nodes each node storing a plurality of partitions of data stored in the distributed data grid each partition comprising a plurality of data objects, the method comprising:
   collecting per-partition performance statistics for each partition of said plurality of partitions stored on said plurality of nodes wherein said per-partition performance statistics include per-partition wait time and execution time;
   calculating a mean per-partition wait time for each node of the plurality of nodes;
   analyzing each node of the plurality of nodes by comparing per-partition wait times for said each node to said mean per-partition wait times for said each node, and determining that said each node has homogenous per-partition wait times if the per-partition wait times for said each node are clustered around said mean per-partition wait time for said each node;
   identifying a source node within the plurality of nodes in the distributed data grid, wherein the source node has exceptional wait times compared to other nodes of the plurality of nodes, and homogeneous per-partition wait times;
   analyzing the plurality of partitions on the source node to identify hot partitions having a disproportionately large share of execution time load compared to other of the plurality of partitions stored by the source node; and
   alleviating load on the source node by migrating one or more partitions other than identified hot partitions from the source node to a target node.

2. The method of claim 1, further comprising:
   using said per-partition performance statistics when identifying said and identifying said hot partitions.

3. The method of claim 1, further comprising selecting a least loaded node from among the plurality of nodes in the distributed data grid to be the target node.

4. The method of claim 1, further comprising selecting a single migration partition from the plurality of partitions stored by the source node other than identified hot partitions for migration from the source node to the target node by assessing load (Lh) on the source node, assessing load (Lc) on the target node, and selecting for migration a single migration partition having a load closest to (Lh−LC)/2.

5. The method of claim 1, further comprising selecting a plurality of migration partitions from the plurality of partitions stored by the source node other than identified hot partitions for migration from the source node to the target node by assessing load (Lh) on the source node, assessing load (Lc) on the target node, and selecting for migration a plurality of migration partitions having a combined load close to (Lh−LC)/2.

6. The method of claim 1, further comprising:
   aggregating said per-partition wait times for all partitions stored on said each node of the plurality of nodes to generate aggregated per-partition wait times for said each node of said plurality of nodes; and
   determining whether a particular node has exceptional wait times compared to other nodes of said plurality of nodes by comparing said aggregated per-partition wait times for said particular node with aggregated per-partition wait times for said other nodes.

7. The method of claim 1, wherein determining that said each node has homogenous per-partition wait times if the per-partition wait times for said each node are clustered around said mean per-partition wait time for said each node comprises:
   detecting outlier partitions and determining that a ratio of the per-partition wait time to the mean per-partition wait time for each of said outlier partitions is no greater than a threshold.

8. A distributed data grid comprising:
   a plurality of nodes each comprising a microprocessor and memory, each node storing in the memory a plurality of partitions of data stored in the distributed data grid each partition comprising a plurality of data objects; and
   a load balancing system wherein the load balancing system is configured to,
      collect per-partition performance statistics for each partition of said plurality of partitions stored on said plurality of nodes wherein said per-partition performance statistics include per-partition wait time and execution time;
   calculate a mean per-partition wait time for each node of the plurality of nodes;
      analyze each node of the plurality of nodes by comparing per-partition wait times for said each node to said mean per-partition wait times for said each node, and determining that said each node has homogenous per-partition wait times if the per-partition wait times for said each node are clustered around said mean per-partition wait time for said each node;
      identify a source node within the distributed data grid, wherein the source node has exceptional wait times compared to other nodes of the plurality of nodes, and homogeneous per-partition wait times;
      analyze the plurality of partitions on the source node to identify hot partitions having a disproportionately large share of the execution time load compared to other partitions stored by the source node; and
      alleviate load on the source node by migrating one or more partitions other than identified hot partitions from the source node to a target node.

9. The distributed data grid of claim 8, wherein the load balancing system is further configured to:
use said per-partition performance statistics to identify said hot partitions.

10. The distributed data grid of claim 8, wherein the load balancing system is further configured to select a least loaded node from among the plurality of nodes in the distributed data grid to be the target node.

11. The distributed data grid of claim 8, wherein the load balancing system is further configured to select a single migration partition from the plurality of partitions stored by the source node other than identified hot partitions for migration from the source node to the target node by assessing load (Lh) on the source node, assessing load (Lc) on the target node, and selecting for migration a single migration partition having a load closest to (Lh−LC)/2.

12. The distributed data grid of claim 8, wherein the load balancing system is further configured to select a plurality of migration partitions from the plurality of partitions stored by the source node other than identified hot partitions for migration from the source node to the target node by assessing load (Lh) on the source node, assessing load (Lc) on the target node, and selecting for migration a plurality of migration partitions having a combined load close to (Lh−LC)/2.

13. The distributed data grid of claim 8, wherein the load balancing system is further configured to:
aggregate said per-partition wait times for all partitions stored on each node of the plurality of nodes to generate aggregated per-partition wait times for each node of said plurality of nodes; and
determine whether a particular node has exceptional wait times compared to other nodes of said plurality of nodes by comparing aggregated per-partition wait times for said particular node with aggregated per-partition wait times for said other nodes.

14. The distributed data grid of claim 8, wherein the load balancing system is further configured to:
detect outlier partitions and determining that a ratio of the per-partition wait time to the mean per-partition wait time for each of said outlier partitions is no greater than a threshold.

15. A non-transitory computer-readable medium including instructions thereon for performing load balancing in a cluster storage system comprising a plurality of nodes, which instructions, when read and executed by a computer, cause the computer to perform steps comprising:
collecting per-partition performance statistics for each partition of said plurality of partitions stored on said plurality of nodes wherein said per-partition performance statistics include per-partition wait time and execution time;
calculating a mean per-partition wait time for each node of the plurality of nodes;
analyzing each node of the plurality of nodes by comparing per-partition wait times for said each node to said mean per-partition wait times for said each node, and determining that said each node has homogenous per-partition wait times if the per-partition wait times for said each node are clustered around said mean per-partition wait time for said each node;
identifying a source node within the cluster storage system from which to move a plurality of data objects, wherein the source node comprises a node with exceptional wait times compared to other nodes, and homogeneous per-partition wait times;
analyzing the partitions on the source node to identify hot partitions wherein a hot partition is a partition with a disproportionately large share of the execution time load compared to other partitions of the source node; and
alleviating load on the source node by migrating one or more partitions from the source node to a target node, wherein the one or more partitions are selected from not hot partitions.

16. The non-transitory computer-readable medium of claim 15, including further instructions thereon, which instructions, when read and executed by a computer, cause the computer to perform steps further comprising:
using said per-partition performance statistics to identify said hot partitions.

17. The non-transitory computer-readable medium of claim 15, including further instructions thereon, which instructions, when read and executed by a computer, cause the computer to perform steps further comprising:
identifying the target node by selecting a least loaded node from among the plurality of nodes in the cluster storage system.

18. The non-transitory computer-readable medium of claim 15, including further instructions thereon, which instructions, when read and executed by a computer, cause the computer to perform steps further comprising:
selecting a single non-hot partition for migration from the source node to the target node by assessing load (Lh) on the source node, assessing load (Lc) on the target node, and selecting for migration a non-hot partition having a load closest to (Lh−LC)/2.

19. The non-transitory computer-readable medium of claim 15, including further instructions thereon, which instructions, when read and executed by a computer, cause the computer to perform steps further comprising:
selecting a plurality of non-hot partitions for migration from the source node to the target node by assessing load (Lh) on the source node, assessing load (Lc) on the target node, and selecting for migration a plurality of partitions having a combined load close to (Lh−LC)/2.

20. The non-transitory computer-readable medium of claim 15, including further instructions thereon, which instructions, when read and executed by a computer, cause the computer to perform steps wherein determining that said each node has homogenous per-partition wait times if the per-partition wait times for said each node are clustered around said mean per-partition wait time for said each node comprises:
detecting outlier partitions and determining that a ratio of the per-partition wait time to the mean per-partition wait time for each of said outlier partitions is no greater than a threshold.

* * * * *